(12) United States Patent
Lee et al.

(10) Patent No.: US 7,425,593 B2
(45) Date of Patent: Sep. 16, 2008

(54) AMPHIPHILIC TRIBLOCK COPOLYMERS COMPRISING POLY(2-VINYLPYRIDINE) BLOCK AND POLY(ALKYL ISOCYANATE) BLOCK, AND THE PREPARATION METHOD THEREOF

(75) Inventors: Jae-Suk Lee, Gwangju (KR); Shahinur Rahman, Gwangju (KR); Shashadhar Samal, Gwangju (KR); Hee-Soo Yoo, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 0 days.

(21) Appl. No.: 11/485,832

(22) Filed: Jul. 13, 2006

(65) Prior Publication Data

US 2007/0060705 A1 Mar. 15, 2007

(30) Foreign Application Priority Data

Aug. 23, 2005 (KR) .................. 10-2005-0077361
Aug. 23, 2005 (KR) .................. 10-2005-0077362

(51) Int. Cl.
*C08G 18/04* (2006.01)
*C08G 81/02* (2006.01)
*G08F 4/46* (2006.01)

(52) U.S. Cl. .............. 525/123; 525/452; 525/539; 528/57; 528/69; 528/73

(58) Field of Classification Search .......... 525/452, 525/539, 123; 528/392, 57, 69, 73
See application file for complete search history.

(56) References Cited

U.S. PATENT DOCUMENTS 3,225,119 A * 12/1965 Baker, Jr. .................. 525/123
6,741,386 B2 * 5/2004 Minami ..................... 359/296
2003/0134998 A1 * 7/2003 Hamada et al. ............ 526/186

OTHER PUBLICATIONS

Rahman et al, "Synthesis and Self-Assembly Studies of Amphiphilic Poly(n-hexyl isocyanate)-block-poly(2-vinylpyridine)-block-poly(n-hexyl isocyanate) Rod-Coil-Rod Triblock Copolymer", Macromolecules 2006, 39, 5009-5014 (Published on Web Jun. 22, 2006).*
Myongsoo Lee, Byoung-Ki Cho, Wang-Cheol Zin: "Supramolecular Structures from Rod-Coil Black Copolymers", *Chem Rev.* 2001, 101, pp. 3869-3892.
Stephan Förster and Markus Antonietti: "Amphiphilic Block Copolymers in Structure-Controlled Nanomaterial Hybrids", *Advanced Materials*, 1998, 10, No. 3, pp. 195-217.
Koji Ishizu: "Synthesis and Structural Ordering of Core-Shell Polymer Microspheres", *Prog. Polym. Sci.*, vol. 23, 1998, pp. 1383-1408.
Stephan Förster and Thomas Plantenber "From Self-Organizing Polymers to Nanohybrid and Biomaterials", *Angew. Chem. Int. Ed.*, 2002, 41, pp. 688-714.
Harm-Anton Klok and Sébastien Lecommandoux: Supramolecular Materials via Block Copolymer Self-Assembly, *Advanced Materials*, 2001, 13, No. 16 (Aug. 16), pp. 1217-1229.
June-Hwan Ahn, Jae-Suk Lee: "Synthesis of Well-Defined Rod-Coil-Rod Polyhexylisocyanate-*block*-polystyrene-*block*-polyhexylisocyanage via One-Pot Anionic Polymerization",*Macromol, Rapid Commun.*, 2003, 24, pp. 571-575.
J.T. Chen, E.L. Thomas, C.K. Ober, G. -p Mao: "Self-Assembled Smectic Phases in Rod-Coil Block Copolymers", *Science*, vol. 273, Jul. 19, 1996, pp. 343-346.
J.T. Chen and E.L. Thomas, "Zigzag Morphology of a Poly(styrene-b-hexyl isocyanate)", *Macromolecules* 1995, 28, 1688-1697.

* cited by examiner

*Primary Examiner*—Fred M Teskin
(74) *Attorney, Agent, or Firm*—Frommer Lawrence & Haug LLP; Ronald R. Santucci

(57) ABSTRACT

The present invention relates to an amphiphilic triblock copolymer comprising a poly(2-vinylpyridine) block and a poly(alkylisocyanate) block and the preparation method thereof, and particularly relates to an amphiphilic triblock copolymer comprising a coil-shaped hydrophilic poly(2-vinylpyridine) block and a rod-shaped lipophilic poly(alkylisocyanate) block, having a controlled structure of coil-rod-coil or rod-coil-rod, and the preparation method thereof.

12 Claims, 5 Drawing Sheets

(a) P2VP
 $M_n$=4690
 $M_w/M_n$=1.06

(b) P2VP-b-PHIC
 $M_n$=8200
 $M_w/M_n$=1.08

(c) P2VP-b-PHIC-b-P2VP
 $M_n$=16100
 $M_w/M_n$=1.14

Elution time (min)

UV applied

AMPHIPHILIC TRIBLOCK COPOLYMERS COMPRISING POLY(2-VINYLPYRIDINE) BLOCK AND POLY(ALKYL ISOCYANATE) BLOCK, AND THE PREPARATION METHOD THEREOF

This application claims priority benefits from Korean Patent Application No. 10-2005-0077361 filed Aug. 23, 2005 and Korean Patent Application No. 10-2005-0077362 filed Aug. 23, 2005.

TECHNICAL FIELD

The present invention relates to amphiphilic triblock copolymers comprising a poly(2-vinylpyridine) block and a poly(alkylisocyanate) block and a preparation method thereof. More particularly, the present invention relates to amphiphilic triblock copolymers comprising a coil-shaped hydrophilic poly(2-vinylpyridine) block and a rod-shaped lipophilic poly(alkylisocyanate) block, having a controlled structure of coil-rod-coil or rod-coil-rod, and a preparation method thereof.

RELATED PRIOR ART

Poly(2-vinylpyridine) has been prepared by performing an anionic polymerization using alkyl lithium as an initiator. However, pyridine ring is susceptible to the nucleophilic attack by the alkyl lithium in a nonpolar solvent, thus having problems of low yields and broad polydispersity due to the difficulty in control of molecular weight. Further, it is known that additional use of ligand such as lithium chloride (LiCl) is necessary for quantified yield when anionic polymerization is performed in a polar solvent such as tetrahydrofuran (THF). However, the lithium chloride has a few drawbacks that it has a low solubility in the solvent and its use is limited to an alkyl lithium initiator.

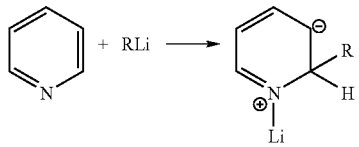

Meanwhile, an amphiphilic coil-rod shaped block copolymer has been drawing much attention as an optical fine polymeric material because of its properties such as phase separation and self-assembly [Lee, M.-S.; Cho, B.-K.; Zin, W.-C. Chem. Rev. 2001, 101, 3869 Forster, S.; Antonietti, M. Adv. Mater. 1998, 10, 195; Ishizu, K. Prog. Polym. Sci. 1998, 23, 1383 Forster, S.; Plantenberg, T. Angew. Chem. Int. Ed. 2002, 41, 688; Klok, H.-A.; Lecommandoux, S. Adv. Mater. 2001, 13, 1217.]. While a coil-coil shaped amphiphilic block copolymer had been mainly developed in the past, polystyrene-block-poly(isocyanate) or polyisoprene-block-polyisocyanate, which comprises a rod-shaped polyisocyanate, has been developed recently [Ahn, J.-H.; Lee, J.-S. Macromol. Rapid Commun. 2003, 24, 571; Chen, J. T.; Thomas, E. L.; Ober, C. K.; Mao, G.-P. Science, 1996, 273, 343 Chen, J. T.; Thomas, E. L.; Ober, C. K.; Hwang, S. S. Macromolecules 1995, 28, 1688.]. However, due to the difficulty in polyisocyante polymerization, the development has been mainly focused on the block copolymers with a relatively high content of styrene or isoprene, which has a relatively stable polymerization mechanism.

DETAILED DESCRIPTION

According to one aspect of the present invention, there is provided an amphiphilic triblock copolymer comprising a coil-shaped hydrophilic poly(2-vinylpyridine) block and a rod-shaped lipophilic poly(alkylisocyanate) block, wherein the copolymer has a controlled structure of a coil-rod-coil or a rod-coil-rod.

According to another aspect of the present invention, there is provided a method of preparing a rod-coil-rod shaped triblock copolymer having a structure of poly(alkylisocyanate)-block-poly(2-vinylpyridine)-block-poly(alkylisocyanate).

According to still another aspect of the present invention, there is provided a method of preparing a coil-rod-coil shaped triblock copolymer having a structure of poly(2-vinylpyridine)-block-poly(alkylisocyanate)-block-poly(2-vinylpyridine).

Hereunder is provided a more detailed description of the present invention.

An example of the amphiphilic triblock copolymer herein is a rod-coil-rod shaped triblock copolymer of formula (I) comprising a coil-shaped poly(2-vinylpyridine) block and a rod-shaped poly(alkylisocyanate) block,

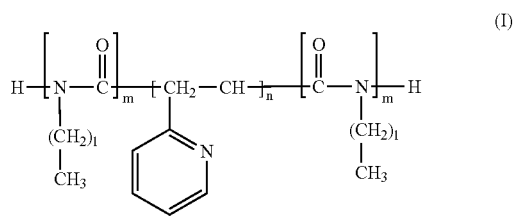

wherein l is an integer of 2-8; n is a degree of polymerization of the poly(2-vinylpyridine) block; m is a degree of polymerization of the poly(alkylisocyanate) block; and $f_{2vp}$ is a fraction of the poly(2-vinylpyridine) block in the range of from 0 to 0.7 ($0 < f_{2vp} < 0.7$).

The rod-coil-rod shaped triblock copolymer of formula (I) can be prepared by performing the following acts of:

(a) preparing a poly(2-vinylpyridine) block having carbanion at each end with a quantified yield and narrow molecular weight distribution by performing living polymerization using metal naphthalenide (M-Naph) as an initiator, (b) converting a counter-cation at the each end of the poly(2-vinylpyridine) block into a sodium ion by adding sodium tetraphenylborate ($NaBPh_4$), and (c) adding alkylisocyanate monomer in the cation-converted poly(2-vinylpyridine) and performing a polymerization.

Polymerization reaction herein is preferably performed by using a glass reactor (FIG. 1) with ampoules comprising initiator, monomer, additive, reaction terminator, respectively, under high vacuum ($10^{-6}$-$10^{-4}$ torr) at low temperature (from $-100°$ C. to $-40°$ C.) according to the conventional process of anionic polymerization. Although THF is used herein, other normal solvents may be used as a polymerization solvent in the present invention.

The step (a) is to prepare a poly(2-vinylpyridine) block with carbanion at both ends by performing a living polymerization.

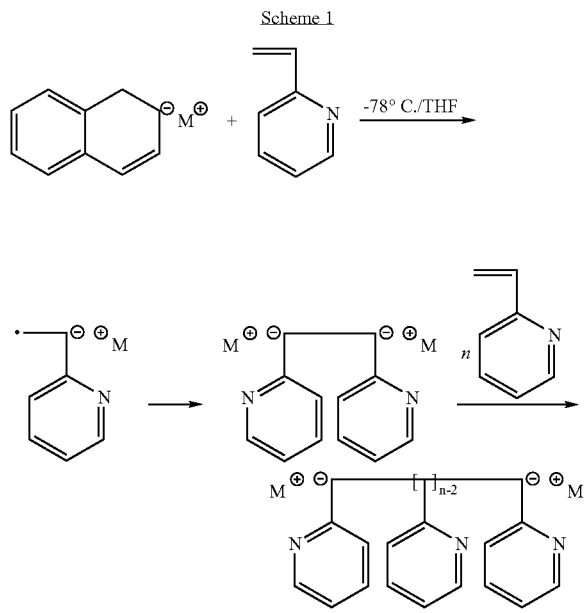

Scheme 1

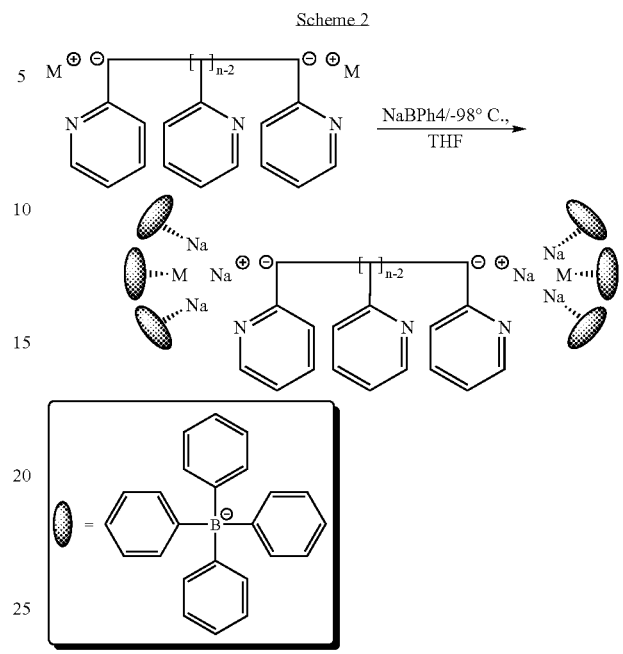

Scheme 2

In the above scheme 1, n is as defined in Formula 1, and M is a monovalent metal atom, preferably alkali metal atom.

Block polymerization device is shown in FIG. 1. First, the initiator is introduced into the reaction flask, which is maintained at a temperature of from −90 toternal magnet. After −40° C. by breaking the ampoule comprising an initiator with an in the initiator reaches the temperature equilibrium, 2-vinylpyridine monomer is introduced into the reaction flask and polymerization is performed for 20-40 min to provide a poly (2-vinylpyridine) homopolymer.

Although alkyl lithium has been conventionally used as an initiator in the polymerization of poly(2-vinylpyridine), causing it difficult to control the molecular weight, metal naphthalenide (M-Naph) is used in the present invention to efficiently control the molecular weight. Examples of the metal naphthalenide include but are not limited to alkali metal naphthalenides such as sodium naphthalenide (Na-Naph) and potassium naphthalenide (K-Naph). The degree of polymerization (Mw/Mn) of the poly(2-vinylpyridine) is preferred to be 1.00-1.62.

The step (b) is to convert the counter-cation of the poly(2-vinylpyridine).

In the above scheme 2, n is as defined in Formula 1, and M is monovalent metal atom, preferably alkali metal atom.

Specifically, metal cation (M⁺) is converted to sodium cation, which is appropriate for the following alkylisocyanate polymerization by using sodium tetraphenylborate (NaBPh₄). The reaction is preferably performed at a temperature of from −100° C. to −60° C. for 20-40 min.

Poly(n-hexylisocyanate) may have a quantified yield and a narrow molecular weight distribution by using sodium ion as a counter-cation. When sodium tetraphenylborate, which serves as a common ion salt, is used, potassium ion (K⁺) is converted into sodium ion (Na⁺) in the polymerization of 2-vinylpyridine, to quantitatively control the polymerization of n-hexylisocyanate. Further, the sodium tetraphenylborate increases the concentration of the counter-cation (i.e. Na⁺), and changes the counter-ion state of amidate anion and sodium counter-cation into contact-ion state, thus making the anion living polymerization possible.

The step (c) is to form poly(alkylisocyanate) block at each end of the poly(2-vinylpyridine) block, thus providing the desired triblock copolymer.

Scheme 3

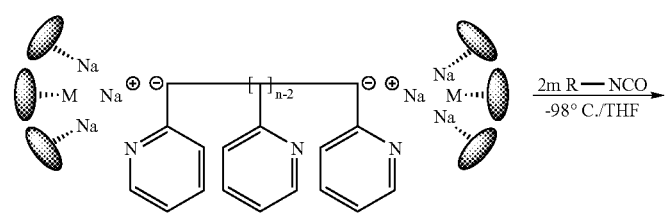

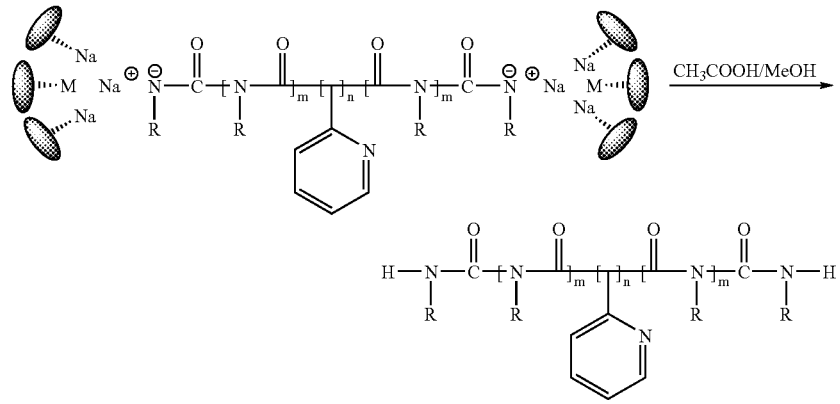

In the above scheme 3, R is —(CH$_2$)$_l$—CH$_3$; M is a monovalent metal atom, preferably alkali metal atom; and l, m and n are as defined in Formula 1.

In the step (c), alkylisocyanate monomer is added and polymerized for 20-40 min to provide a poly(alkylisocyanate) block. After terminating the reaction by adding a terminating agent to prevent side reaction of the end active group, the products are precipitated in methanol or hexane according to the block composition to provide the polymers. Methanol alone, methanol-chloric acid mixture or preferably methanol-acetic acid mixture may be used as the terminating agent. The mixing ratio of methanol to chloric acid or acetic acid is preferred to be in the range of from 1:10$^{-3}$ to 10$^{-1}$ (v/v).

Thus prepared rod-coil-rod shaped triblock copolymer has molecular weight distribution (Mw/Mn) of 1.00-1.43.

Another example of the amphiphilic triblock copolymer herein is a coil-rod-coil shaped triblock copolymer of Formula (II) comprising a coil-shaped poly(2-vinylpyridine) block and a rod-shaped poly(alkylisocyanate) block:

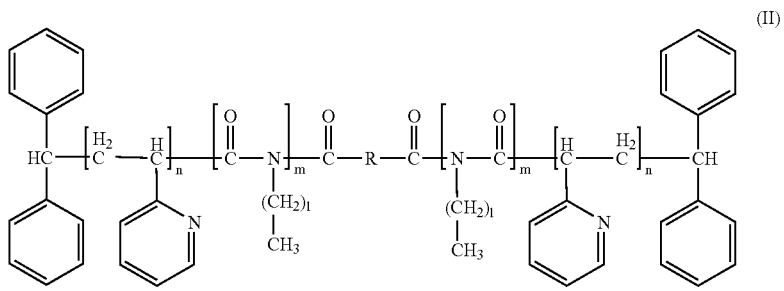

In the above formula II, R is a C$_1$-C$_6$ alkyl group unsubstituted or substituted with hydroxyl, C$_1$-C$_{10}$ alkyl, amide, ether, phenyl, hetero aromatic group or a functional group selected from

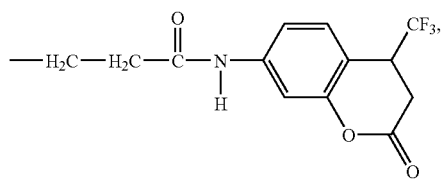

-continued

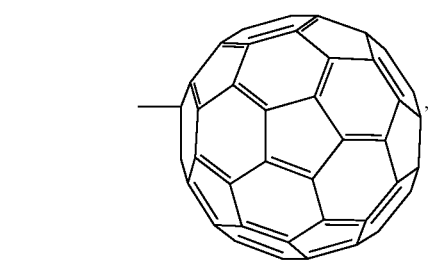

-continued

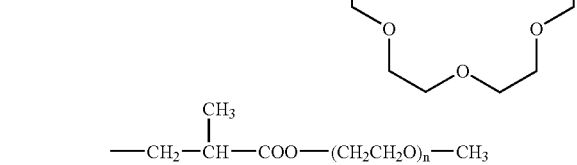

(where n is an integer of 10-40),

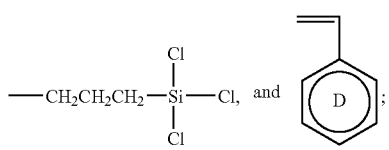

l is an integer of 2-8; n is a degree of polymerization of the poly(2-vinylpyridine) block; m is a degree of polymerization of the poly(alkylisocyanate) block; and $f_{2vp}$ is a fraction of the poly(2-vinylpyridine) block and ranges from 0 to 0.7 ($0<f_{2vp}<0.7$).

The coil-rod-coil shaped triblock copolymer of formula (II) can be prepared by a process comprising:
(a) preparing a poly(2-vinylpyridine) block having carbanion at only one end with a quantified yield and narrow molecular weight distribution by performing living polymerization using potassium diphenylmethane (K-CHPh$_2$) as an initiator,
(b) converting potassium counter-cation into sodium by using sodium tetraphenylborate (NaBPh$_4$),
(c) preparing poly(alkylisocyanate) block by adding alkylisocyanate and performing polymerization, and
(d) coupling the (poly(2-vinylpyridine)-block-poly(alkylisocyanate) by using di(carbonylhalide) coupling agent.

Polymerization reaction herein is preferably performed by using a glass reactor (FIG. 2) with ampoules comprising an initiator, a monomer, an additive, a reaction terminator, respectively, under high vacuum ($10^{-6}$-$10^{-4}$ torr) at low temperature (from −100° C. to −40° C.) according to the conventional process of anion polymerization. Although THF is used herein, other normal solvents may be used as a polymerization solvent in the present invention.

The step (a) is to prepare a poly(2-vinylpyridine) block with carbanion only at one end of the poly(2-vinylpyridine) block by performing a living polymerization.

Scheme 4

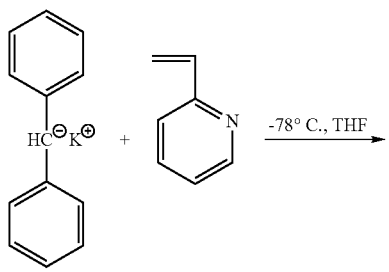

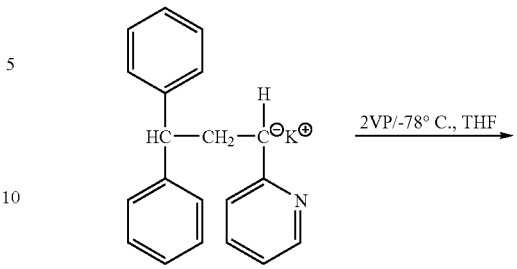

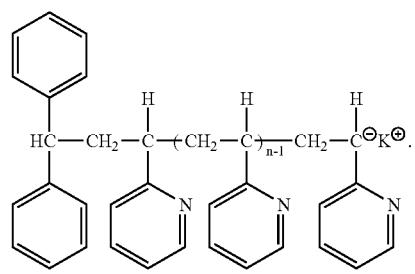

In the above scheme 4, n is same as defined in Formula 2.

Block polymerization device is shown in FIG. 2. First, the initiator is introduced into the reaction flask, which is maintained at a temperature of from −90 to −40° C. by breaking the ampoule comprising initiator with internal magnet. After allowing the initiator to reach the temperature equilibrium, 2-vinylpyridine monomer is introduced into the reaction flask and polymerization is performed for 20-40 min to provide a poly(2-vinylpyridine) homopolymer.

Although alkyl lithium has been conventionally used as an initiator in the polymerization of poly(2-vinylpyridine), making it difficult to control the molecular weight, potassium diphenylmethane (K-DPM or K-CHPh$_2$) is used in the present invention to efficiently control the molecular weight. The degree of polymerization (Mw/Mn) of the poly(2-vinylpyridine) is preferred to be 1.00-1.09.

The step (b) is to convert the counter-cation of the poly(2-vinylpyridine).

Scheme 5

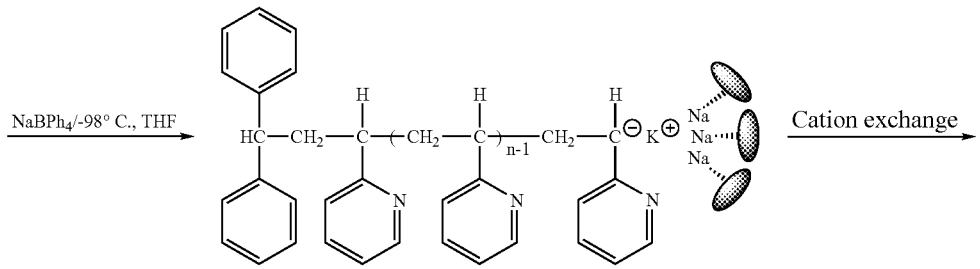

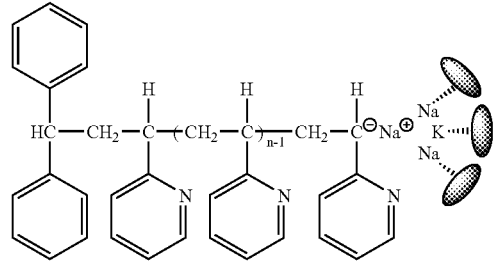

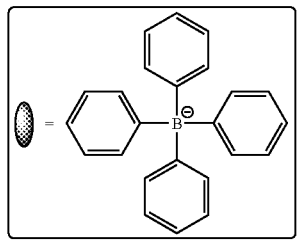

In the above scheme 5, n is as defined in Formula 2.

Specifically, metal cation is converted to sodium cation, which is appropriate for the following alkylisocyanate polymerization by using sodium tetraphenylborate (NaBPh$_4$) as an additive. The reaction is preferably performed at a temperature of from −100° C. to −60° C. for 20-40 min.

Poly(n-hexylisocyanate) may have a quantified yield and a narrow molecular weight distribution by using sodium ion as a counter-cation. When sodium tetraphenylborate, which serves as a common ion salt, is used, potassium ion (K$^+$) is converted into sodium ion (Na$^+$) in the polymerization of 2-vinylpyridine, thus enabling to quantitatively control the polymerization of n-hexylisocyanate. Further, the sodium tetraphenylborate increases the concentration of the counter-cation (i.e. Na$^+$), and changes the counter-ion state of amidate anion and sodium counter-cation into contact-ion state, thus making the anion living polymerization possible.

The step (c) is to form poly(alkylisocyanate) block.

Scheme 6

HIC/−98° C., THF

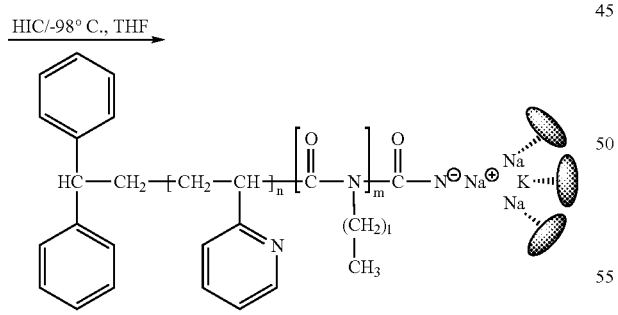

In the above scheme 6, l, m and n are as defined in Formula 2.

In the step (c), alkylisocyanate monomer is added and polymerization is performed at a temperature of from −100 to −60° C. for 20-40 min to provide the poly(alkylisocyanate) block.

The step (d) is to perform a coupling reaction between the poly(2-vinylpyridine) block and poly(alkylisocyanate) block to provide a coil-rod-coil shaped triblock copolymer.

Scheme 7

1) Coupling agent/−98° C.
2) CH$_3$COOH—MeOH/−98° C.

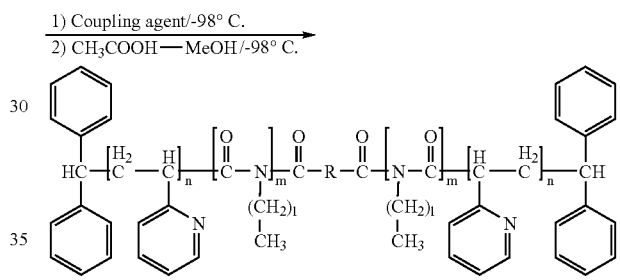

In the above scheme 7, l, m and n are same as defined in Formula 2.

The coupling reaction is preferably performed in the presence of an appropriate base at a temperature of from −100 to −60° C. at 10-20 min. The coupling agent is preferred to be di(carbonylhalide) of Formula 3, having various functional groups:

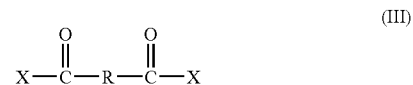

(III)

wherein R is as defined in Formula 2 and X is halogen atom.

Normal organic amine such as alkyl amine and pyridine may be used as the aforementioned amine, preferably in an amount of 1-3 moles per one mole of the coupling agent, more preferably in an equivalent molar amount. After terminating the reaction by adding terminating agent to prevent side reaction of the end active group, the products are precipitated in methanol or hexane according to the block composition to provide the polymers. After terminating the reaction with coupling agent, methanol-acetic acid was introduced to the reactor to terminate P2VP-PHIC diblock, if any.

Thus prepared coil-rod-coil shaped triblock copolymer has molecular weight distribution (Mw/Mn) in the range of from 1.00 to 1.18.

Thus prepared triblock copolymer herein has an amphiphilicity and may be used for developing a device by using the solubility difference between the blocks and self-assembly membrane formation. Further, poly(2-vinylpyridine) block may coordinate metal particle and may have application in developing nano particle or functional nano composite, which uniformly disperses into a polymer. In addition, an application in nanoporous device is also expected when poly(alkylisocyanate) block is removed with thermal treatment because of relatively low thermal stability of the isocyanate block. The application may also be anticipated in an optical switch device that may rotate planar polarized light in UV absorption band due to the rigid helix structure of the poly(alkylisocyanate) block and the optical property induced by a chiral terminating agent. The suggestion and application of new block-structured model for studying phase-separation of the rod-shaped polyisocyanate and coil-shaped poly(2-vinylpyridine) block.

The coil-rod-coil shaped triblock copolymer herein may be used to prepare polymers with various functional groups by performing a Michael addition reaction of various functional materials such as fluorescence material, fullerene, crown ether, poly(ethylene glycol), cyclodextrine, styrene-$d_8$, antibody and antigen.

The functional materials that may be introduced into the triblock copolymer are the compounds comprising the following functional groups:

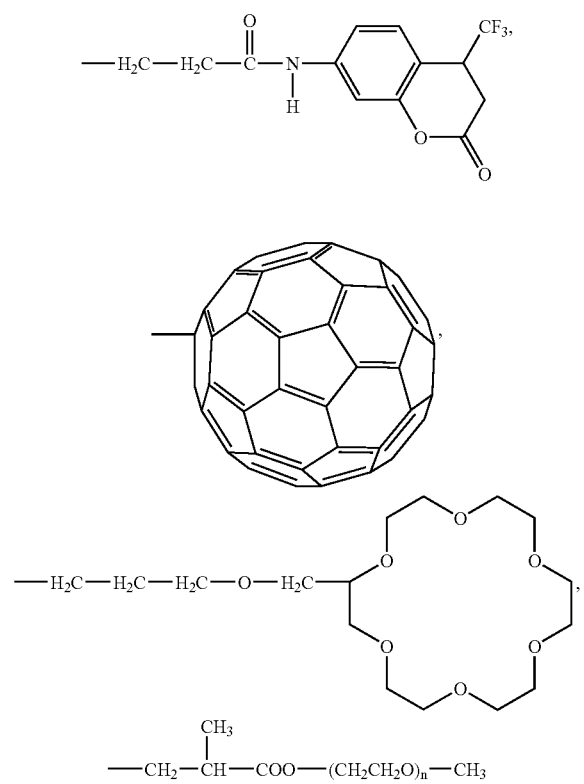

(wherein n is an integer of 10-40),

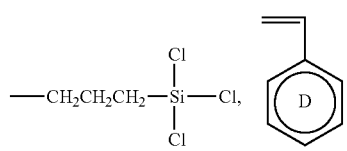

Figure 1:
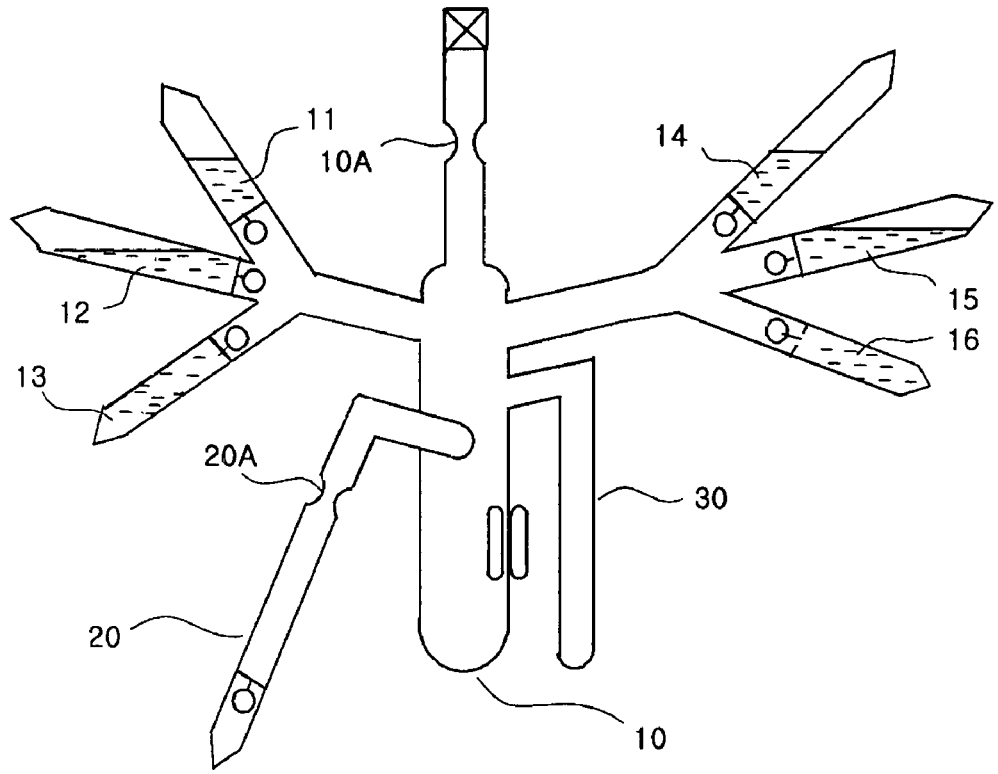
FIG. 1 is a schematic drawing of the anionic polymerization device for preparing the rod-coil-rod shaped triblock copolymer of the present invention.

Explanations of the Reference Numerals in the Drawings are as Follows:

10: a main reactor;
10A, 20A: cut surface;
11, 12: ampoules comprising monomer;
13: an ampoule comprising terminating agent;
14: an ampoule comprising ion exchange material;
15: an ampoule comprising washing solution;
16: an ampoule comprising an initiator;
17: an ampoule comprising a coupling agent;
20: tube for recycling washing solution;
30: tube for containing homopolymer

EXAMPLES

The present invention is described more specifically by the following Examples. Examples herein are meant only to illustrate the present invention, but in no way to limit the scope of the claimed invention.

Examples 1-6 and Comparative Examples 1-6

Preparation of PHIC-b-P2VP-b-PHIC triblock copolymer

Rod-coil-rod shaped triblock copolymer comprising 2-vinylpyridine and n-hexylisocyanate was performed by using sodium naphthalenide (Na-Naph) or potassium naphthalenide (K-Naph) as an initiator.

First, poly(2-vinylpyridine) homopolymer was prepared by using 2-vinylpyridine (2VP) monomer at −78° C. and under high vacuum ($10^{-6}$ torr) in the solvent of THF for 30 min. The temperature of −78° C. was maintained by adding dry ice in a constant-temperature bath with acetone, and measured with a thermometer for low temperature.

As shown in FIG. 1, the polymerization reactor has glass ampoules comprising initiator (Na-Naph or K-Naph), monomer (2VP, HIC), additive (NaBPh$_4$), terminating agent (methanol/acetic acid) and washing solution, respectively.

The reactor is connected to vacuum line to cause the high vacuum and nitrogen atmosphere in the reactor, and then separated from the vacuum line and sealed. After the separated reactor was washed with the washing solution in an ampoule, the initiator was introduced into the reactor by breaking the ampoule. The reactor was placed in a constant-temperature bath with acetone, and the inside and reactants reached the temperature equilibrium down to −78° C. 2-vinylpyridine monomer was introduced and polymerization was performed for 30 min.

After part of the poly(2-vinylpyridine) homopolymer was moved to the tube for containing homopolymer (30), additive of sodium tetraphenylborate was introduced into the main reactor (10) to convert the counter-cation from potassium ion to sodium ion. The reactor was moved to the chamber where temperature was maintained at −98° C. by adding liquid nitrogen in methanol.

After temperature reached equilibrium, another monomer of n-hexylisocyanate was introduced and polymerization was performed for 20 min. The polymerization was terminated by adding methanol-acetic acid mixture. Thus obtained rod-coil-rod shaped triblock copolymer was precipitated in excess methanol and filtered, followed by vacuum-drying or freeze-drying.

Details about the synthesis of the rod-coil-rod shaped triblock copolymer comprising 2-vinylpyridine and n-hexylisocyanate are provided in Table 1.

Further, the block copolymer herein showed a phase-separation behavior when dissolved in solvent such as THF, and also exhibited liquid crystallinity by the rod-shaped isocyanate block. This phase-separation behavior increases the chances of application in self-assembly or nano particle and nano composite with nano inorganic particles.

Examples 7-11 and Comparative Examples 7-8

Preparation of P2VP-b-PHIC-b-P2VP triblock copolymer

To synthesize the coil-rod-coil shaped triblock copolymer, a coil-rod shaped di-block copolymer was first prepared by anionic polymerization, followed by coupling reaction to provide the desired the coil-rod-coil shaped triblock copolymer.

First, poly(2-vinylpyridine) homopolymer was prepared by using 2-vinylpyridine (2VP) monomer at −78° C. and under high vacuum ($10^{-6}$ torr) in the solvent of THF for 30 min. The temperature of −78° C. is maintained by adding dry ice in a constant-temperature bath with acetone, and measured with a thermometer for low temperature. The initiator of potassium diphenylmethane (DPM-K) was prepared by reacting potassium-naphthalene (K-NaPh) ion solution with diphenylmethane, and diluted to appropriate concentration

TABLE 1

| Examples | Counter-cation (M) | Used material(mmol) | | | | Time(min)/ temp.(° C.) | $M_n$[c] | | Polydispersity $(M_w/M_n)$[c] | Yield (%) |
| --- | --- | --- | --- | --- | --- | --- | --- | --- | --- | --- |
| | | M-Naph | 2VP | NaBPh$_4$ | HIC | | Calculated | Measured | | |
| Comp. Ex. 1 | Na | 0.12 | 7.70 | — | — | 30/−78 | 13,400[a] | 13,000 | 1.12 | 100 |
| Ex. 1 | Na | 0.10 | 6.52 | 0.76 | 3.48 | 20/−98 | 22,500[b] | 23,300 | 1.08 | 98 |
| Comp. Ex. 2 | Na | 0.13 | 7.80 | — | — | 30/−78 | 12,600[a] | 12,300 | 1.07 | 100 |
| Ex. 2 | Na | 0.11 | 6.56 | 0.99 | 6.06 | 20/−98 | 26,500[b] | 27,000 | 1.08 | 98 |
| Comp. Ex. 3 | Na | 0.13 | 7.76 | — | — | 30/−78 | 12,500[a] | 12,800 | 1.07 | 100 |
| Ex. 3 | Na | 0.11 | 6.54 | 1.02 | 15.01 | 20/−98 | 47,100[b] | 49,000 | 1.10 | 99 |
| Comp. Ex. 4 | K | 0.12 | 4.70 | — | — | 30/−78 | 8,200[a] | 7,600 | 1.42 | 99 |
| Ex. 4 | K | 0.09 | 3.56 | 0.73 | 0.80 | 20/−98 | 10,500[b] | 8,500 | 1.32 | 97 |
| Comp. Ex. 5 | K | 0.14 | 7.77 | — | — | 30/−78 | 11,600[a] | 8,800 | 1.62 | 98 |
| Ex. 5 | K | 0.11 | 6.46 | 1.11 | 2.0 | 20/−98 | 16,900[b] | 10,500 | 1.37 | 95 |
| Comp. Ex. 6 | K | 0.16 | 6.15 | — | — | 30/−78 | 8,100[a] | 6,700 | 1.22 | 99 |
| Ex. 6 | K | 0.12 | 4.63 | 1.18 | 4.25 | 20/−98 | 17,100[b] | 9,900 | 1.43 | 97 |

[a] Number average molecular weight (Mn) was calculated as follows. Mn = [2VP]/[M-Naph] × Molecular weight of 2-vinylpyridine
[b] Number average molecular weight (Mn) was calculated as follows. Mn = {[2VP]/[M-Naph] × Molecular weight of 2-vinylpyridine + [HIC]/[M-Naph] × Molecular weight of n-hexylisocyanate} × 2.
[c] Polydispersity was calculated by SEC-LS at 40° C. using THF and trimethylamine.

Figure 3:
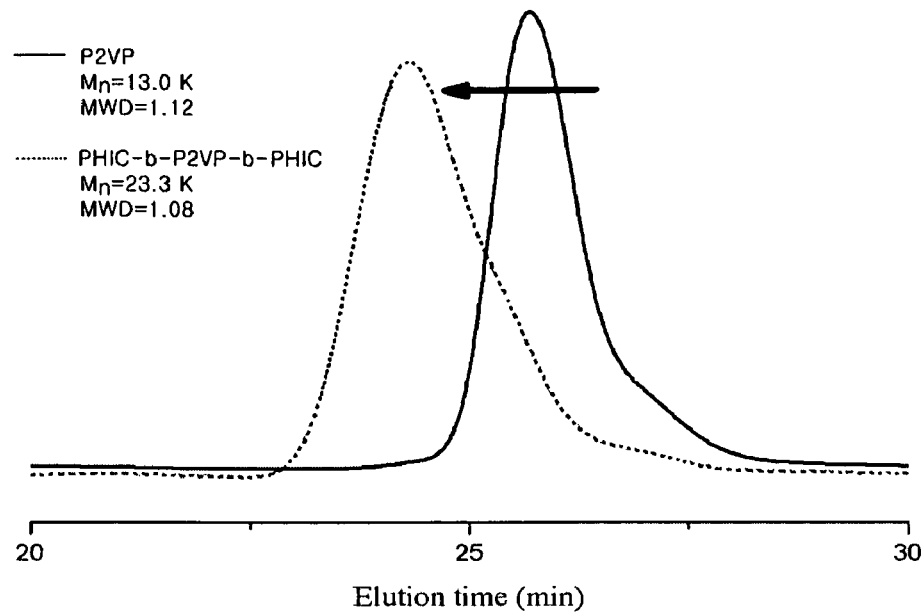
FIG. 3 shows results of size exclusion chromatography connected with multiangle light scattering (SEC-LS) for the P2VP homopolymer and the PHIC-b-P2VP-b-PHIC triblock copolymer. As used herein, the the terms of 'P2VP' and 'PHIC' refer to 'poly(2-vinylpyridine) homopolymer' and 'poly(n-hexylisocyanate) homopolymer', respectively.

FIG. 3 shows results of size exclusion chromatography connected with multiangle light scattering (SEC-LS) for P2VP homopolymer (Comparative Example 1) and PHIC-b-P2VP-b-PHIC triblock copolymer (Example 1). Both the poly(2-vinylpyridine) homopolymer and the triblock copolymer show single peak, which means that the transition from homopolymer to triblock copolymer was successfully performed.

Figure 4:
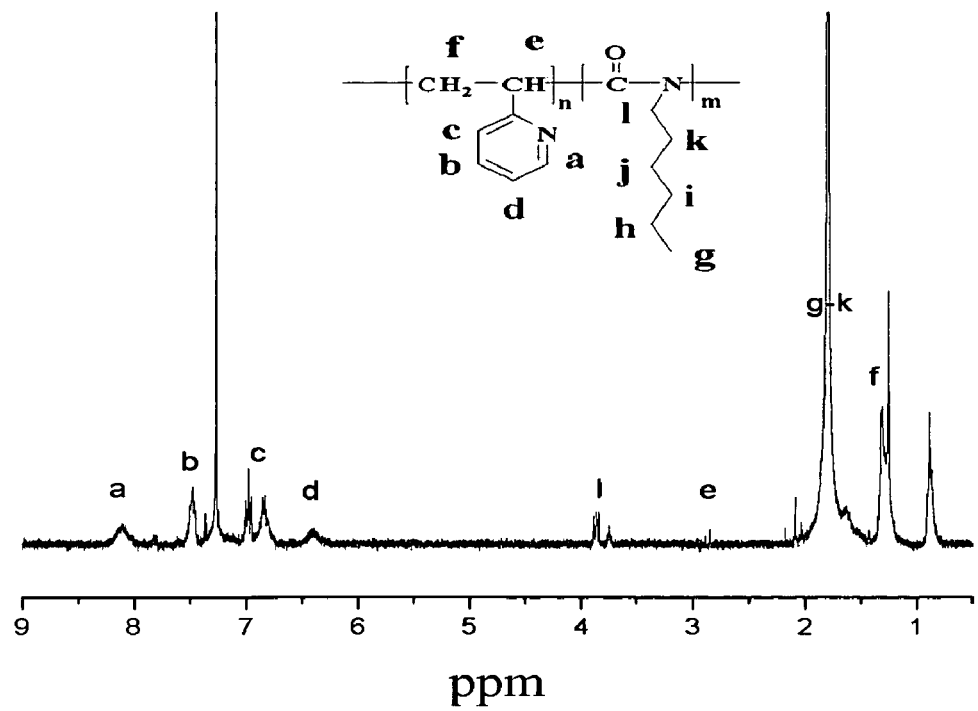
FIG. 4 is $^1$H NMR data for the PHIC-b-P2VP-b-PHIC triblock copolymer.

FIG. 4 shows $^1$H NMR result for the PHIC-b-P2VP-b-PHIC triblock copolymer (Example 1). Characteristic peak of each block changes in height depending on the content. Thus calculated degree of reaction was verified to be nearly the same with measured ones.

Figure 5:
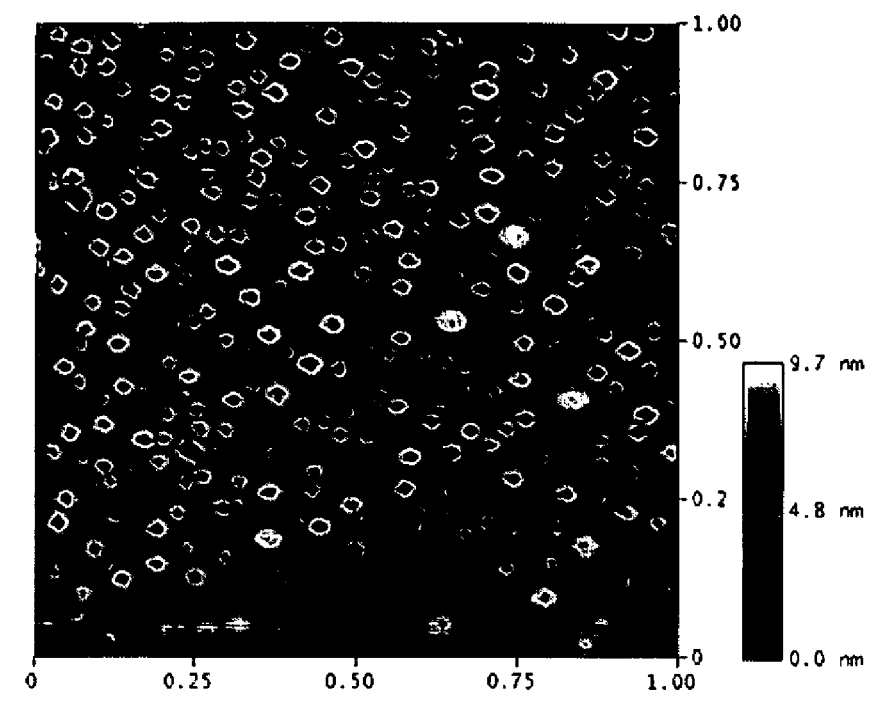
FIG. 5 is AFM data for the surface the PHIC-b-P2VP-b-PHIC triblock copolymer.
Figure 5:
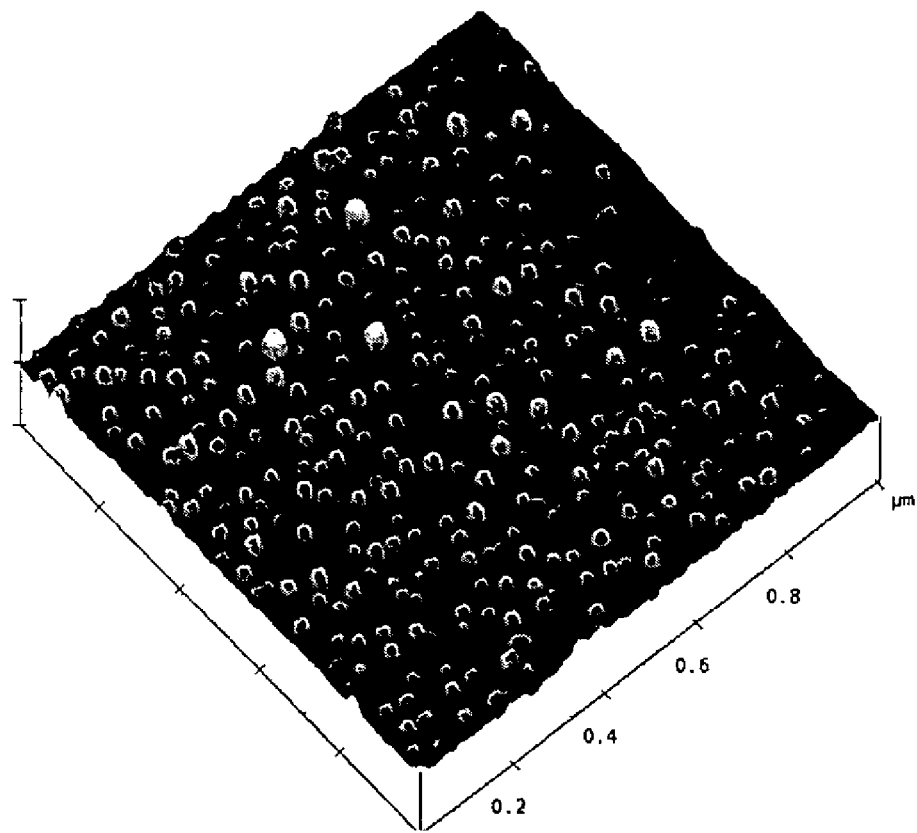

FIG. 5 is an AFM result of the surface of the PHIC-b-P2VP-b-PHIC triblock copolymer (Example 1). The surface was observed after specimen of the block copolymer (molecular weight=23,300, concentration=5 mg/mL, n-hexylisocyanate content=30%) was dissolved in chloroform, cast on the substrate and annealed at 110° C. for 16 hours.

using a distribution device connected to vacuum line. The initiator was divided into glass ampoules and stored in a low temperature refrigerator.

Figure 2:
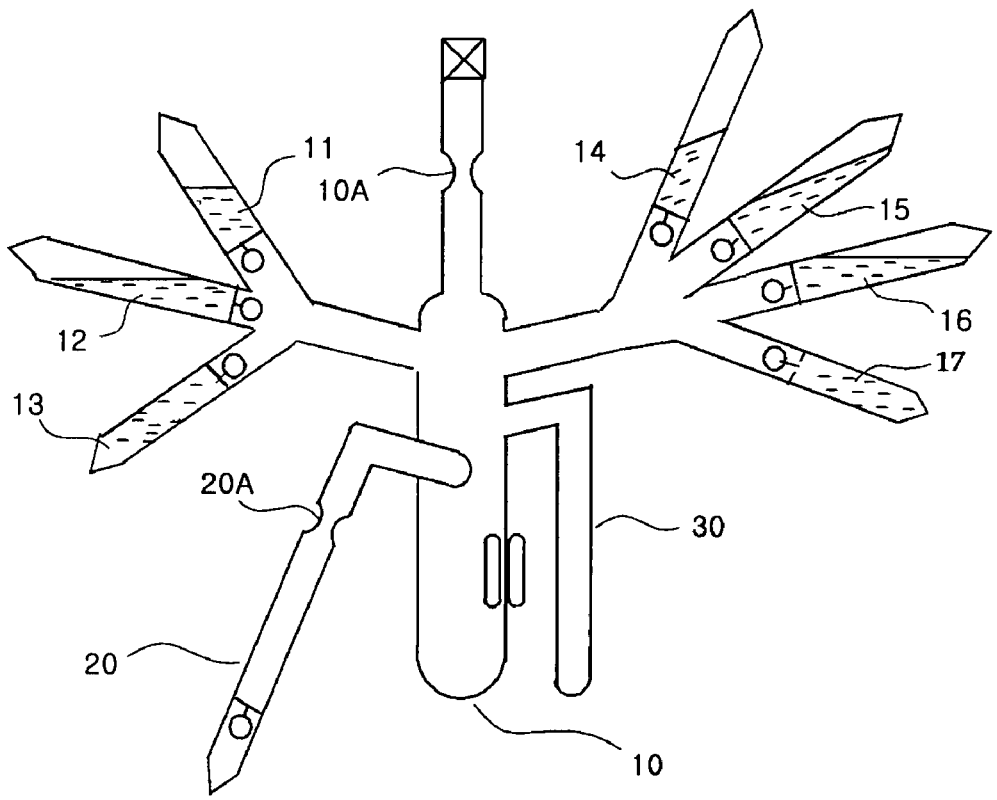
FIG. 2 is a schematic drawing of the anionic polymerization device for preparing the coil-rod-coil shaped triblock copolymer of the present invention.

As shown in FIG. 2, the polymerization reactor has glass ampoules comprising initiator (DPM-K), monomer (2VP, HIC), additive (sodium tetraphenylborate, NaBPh$_4$), terminating agent (methanol/acetic acid) and washing solution, respectively. The reactor is connected to vacuum line to cause the high vacuum and nitrogen atmosphere in the reactor, and then separated from the vacuum line and sealed. After the separated reactor was washed with the washing solution in an ampoule, the initiator was introduced into the reactor by breaking the ampoule. The reactor was placed in a constant-temperature bath with acetone, and the inside and reactants reached the temperature equilibrium down to −78° C. 2-vinylpyridine monomer was introduced and polymerization was performed for 30 min.

After part of the poly(2-vinylpyridine) homopolymer was moved to the tube for containing homopolymer (30), additive of sodium tetraphenylborate was introduced into the main reactor (10) to convert the counter-cation from potassium ion to sodium ion. The reactor was moved to a chamber where temperature kept at −98° C. by adding liquid nitrogen in methanol. After the temperature reached equilibrium, another monomer of n-hexylisocyanate (HIC) was introduced and polymerization was performed for 10-20 min.

Coupling reaction was performed by adding diacid chloride at −98° C. for 10-20 min.

After the coupling reaction, methanol-acetic acid mixture was added to confirm termination of the P2VP-PHIC diblock, if any. Thus obtained triblock copolymer was precipitated in excess methanol or hexane according to the block composition and filtered, followed by vacuum-drying or freeze-drying.

Details about the synthesis of the coil-rod-coil shaped triblock copolymer comprising 2-vinylpyridine and n-hexylisocyanate are provided in Table 2.

from homopolymer to triblock copolymer through diblock copolymer was successfully performed.

Figure 7:
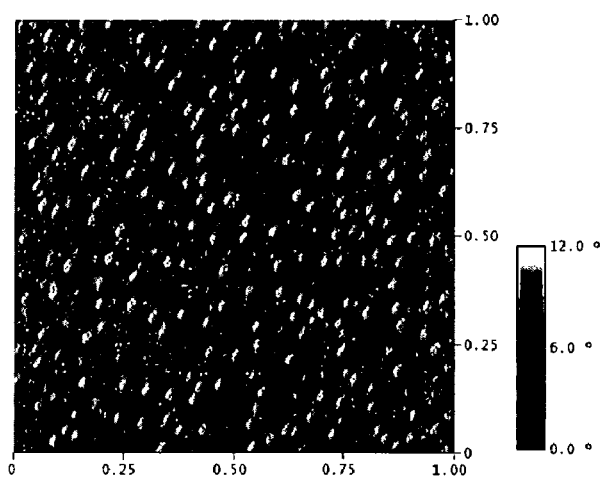
FIG. 7 is AFM data for the P2VP-b-PHIC-b-P2VP triblock copolymer nano particle.
Figure 8:
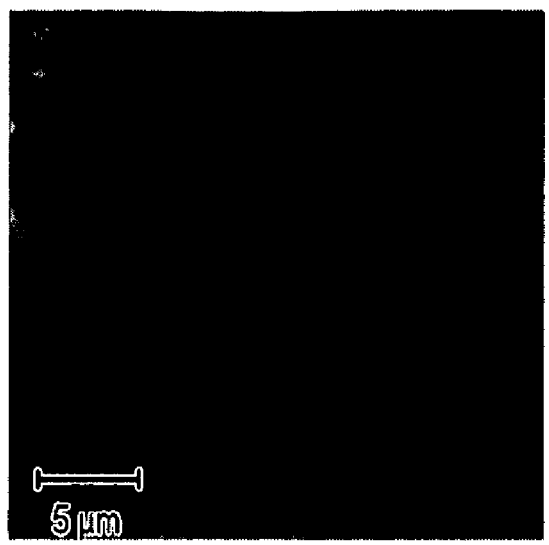
FIG. 8 is CLSM result for the micro-vesicles of the P2VP-b-PHIC-b-P2VP triblock copolymer.

FIGS. 7 and 8 are results of AFM and CLSM for the P2VP-b-PHIC-b-P2VP triblock copolymer, respectively.

Example 12

Preparation of Functional-Group-Substituted P2VP-b-PHIC-b-P2VP Triblock Copolymer The coil-rod-coil shaped triblock copolymer of the present invention may be prepared so that it has various functional group by performing an additive reaction of functional material comprising double bond, such as fluorescence material, fullerene, crown ether, poly(ethylene glycol), cyclodextrine, styrene-$d_8$, antibody and antigen.

1 g (0.0318 mmol) of triblock copolymer having a molecular weight of 31,400 (Example 9) was dissolved in a mixed

TABLE 2

| | Used material (mmol) | | | | | | Mn | | Polydispersity | Yield |
|---|---|---|---|---|---|---|---|---|---|---|
| | | | | | Coupling | | | | | |
| Examples | DPM-K | 2VP | NaBPh$_4$ | HIC | agent | Pyridine | Calculated | Measured | (Mw/Mn) [g] | (%) |
| Comp. Ex. 7 | 0.17 | 7.55 | — | — | — | — | 4,820 [d] | 4,690 | 1.06 | 100 |
| Comp. Ex. 8 | 0.14 | 5.93 | 0.87 | 4.23 | — | — | 8400 [e] | 8200 | 1.08 | 100 |
| Ex. 7 | 0.14 | 5.93 | 0.87 | 4.23 | 0.08 [a] | 0.08 | 16,600 [f] | 16,100 | 1.14 | 100 |
| Ex. 8 | 0.12 | 6.54 | 0.83 | 16.64 | 0.08 [a] | 0.08 | 45,600 [f] | 47,100 | 1.11 | 98 |
| Ex. 9 | 0.13 | 13.13 | 0.85 | 5.36 | 0.07 [b] | 0.07 | 31,800 [f] | 31,400 | 1.13 | 100 |
| Ex. 10 | 0.14 | 5.98 | 0.87 | 13.91 | 0.08 [b] | 0.08 | 34,300 [f] | 33,500 | 1.08 | 100 |
| Ex. 11 | 0.15 | 2.02 | 0.93 | 1.94 | 0.09 [c] | 0.09 | 6,200 [f] | 6,300 | 1.07 | 99 |

[a] Suberoyl chloride
[b] Malonyl chloride
[c] Chiral diacid chloride
[d] Number average molecular weight (Mn) was calculated as follows: Mn = [2VP]/[DPM-K] × Molecular weight of 2-vinylpyridine + Molecular weight of diphenylmethne.
[e] Number average molecular weight (Mn) was calculated as follows: Mn = [2VP]/[DPM-K] × Molecular weight of 2-vinylpyridine + [HIC]/[DPM-K] × Molecular weight of n-hexylisocyanate + Molecular weight of diphenyl methane.
[f] Number average molecular weight (Mn) was calculated as follows: Mn = {[2VP]/[DPM-K] × Molecular weight of 2-vinylpyridine + [HIC]/[DPM-K] × Molecular weight of n-hexylisocyanate + Molecular weight of diphenyl methane} × 2.
[g] Polydispersity was calculated by SEC-LS at 40° C. using THF and trimethylamine.

According to Table 2, the 2-vinylpyridine block, the polymerization of which is initiated by potassium diphenylmethane, was verified to have a quantified yield, a narrow molecular weight distribution and a controlled molecular weight. When the counter-cation was not converted from potassium to sodium by using sodium tetraphenylborate, the yield of isocyanate block was low and cyclic terpolymer (i.e., a product of side reaction) was observed. However, coil-rod-coil shaped triblock copolymer may have a quantified yield and a narrow molecular weight distribution because of the use of 5-10 times of sodium tetraphenylborate.

Figure 6:
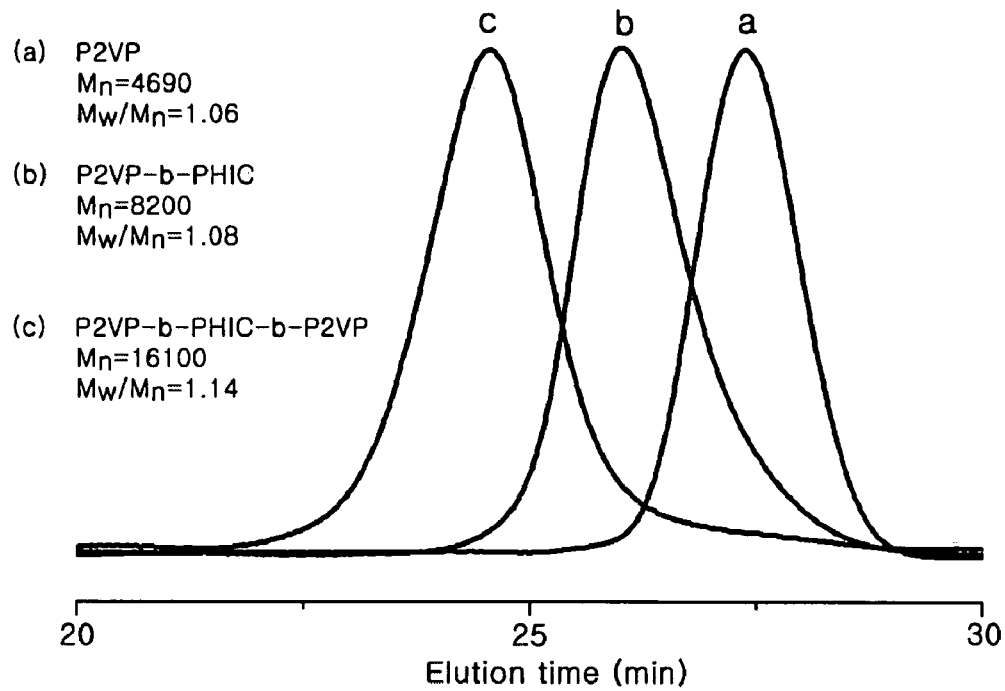
FIG. 6 shows results of size exclusion chromatography connected with multiangle light scattering (SEC-LS) for the P2VP homopolymer (a), P2VP-b-PHIC di-block copolymer (b) and P2VP-b-PHIC-b-P2VP triblock copolymer (c).

FIG. 6 is a result of SEC-LS for the P2VP homopolymer, P2VP-b-PHIC diblock copolymer and P2VP-b-PHIC-b-P2VP triblock copolymer. It was verified that the transition solution of THF (10 mL) and methylene chloride (30 mL), and was added with 0.009 g of 7-(4-trifluoromethyl) cumarin acrylamide and 0.5 mL of triethylamine, followed by reaction at 40° C. for 3 hours. Quantified yield was observed.

Experimental Examples

As shown in Table 3, instead of 7-(4-trifluoromethyl)cumarin acrylamide (1), fullerene (2), 2-(allyloxymethyl)-18-crown-6-ether (3), poly(ethylene glycol) methyl ether methacrylate (4), allyltrichlorosilane (5) and styrene-$d_8$ (6) was used to introduce functional group (X). The properties of thus prepared functional block copolymer are provided in Table 3.

TABLE 3

| RUN | P2VP-PHIC-P2VP (Mn = 31,400, $f_{2vp}$ = 70%) (g) | X(g) | TEA(mL) | THF/MC | Yield(%) |
|---|---|---|---|---|---|
| 1 | 1 | 0.009 [1] | 0.50 | 10 mL/30 mL | 95 |
| 2 | 0.20 | 0.005 [2] | 0.20 | 5 mL/15 mL | 93 |
| 3 | 0.20 | 0.002 [3] | 0.20 | 5 mL/15 mL | 96 |
| 4 | 0.25 | 0.008 [4] | 0.20 | 5 mL/15 mL | 95 |
| 5 | 0.30 | 0.002 [5] | 0.25 | 5 mL/15 mL | 98 |
| 6 | 0.30 | 0.001 [6] | 0.20 | 5 mL/15 mL | 97 |

TABLE 3-continued

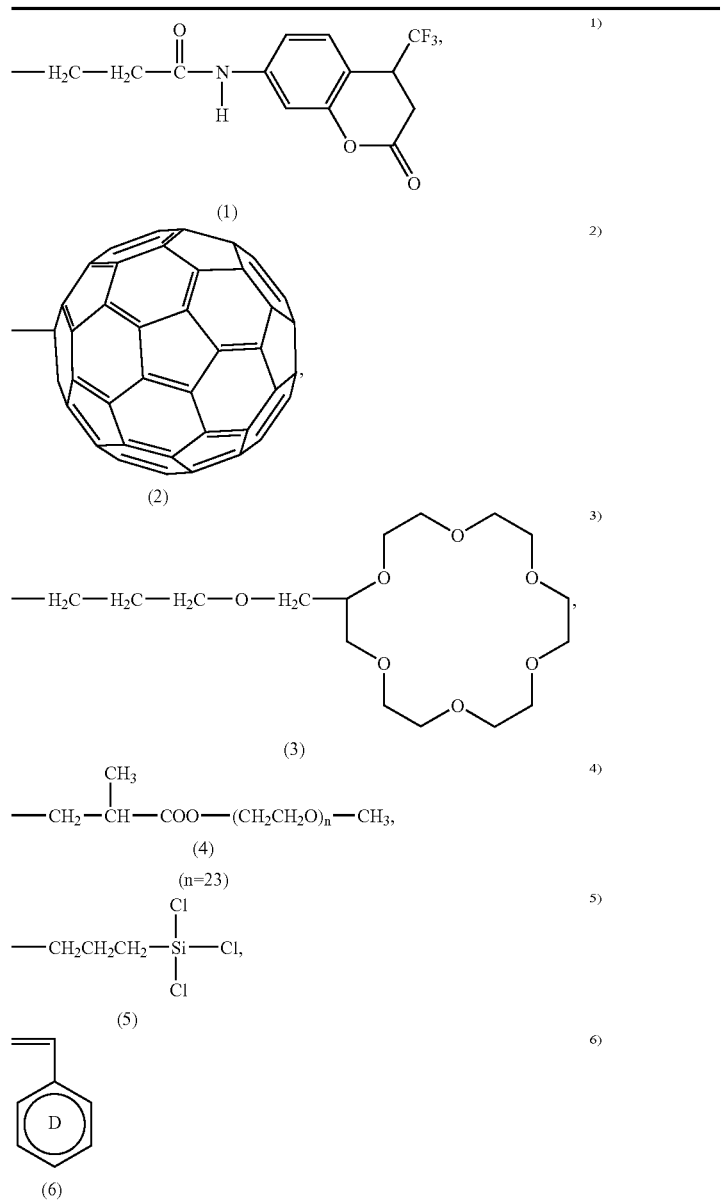

Figure 9:
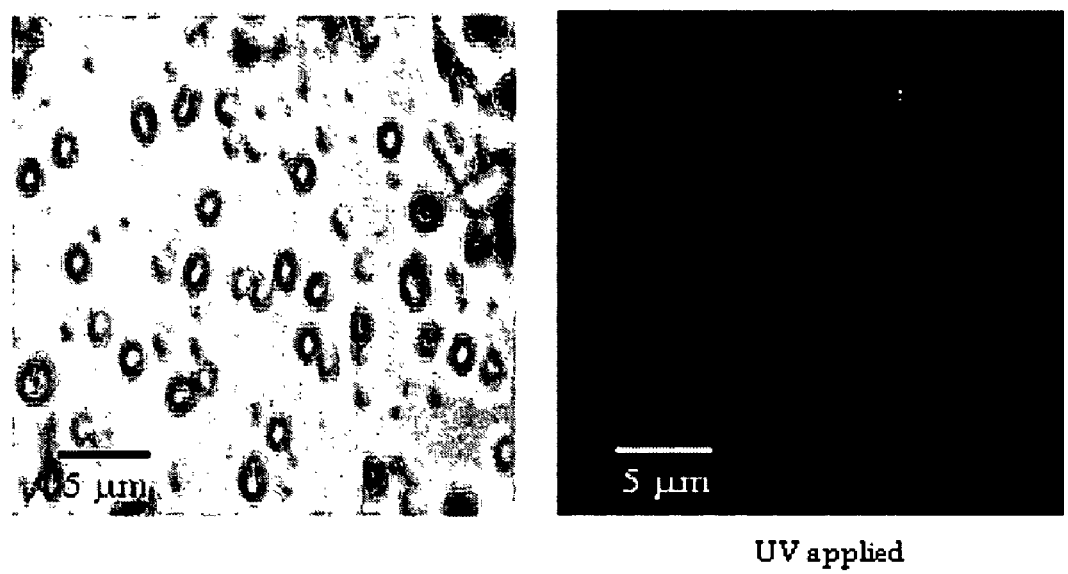
FIG. 9 is CLSM results for the micro-vesicle of the fluorescently substituted P2VP-b-PHIC-b-P2VP triblock copolymer.

FIG. 9 is a CLSM result for the P2VP-b-PHIC-b-P2VP triblock copolymer substituted with

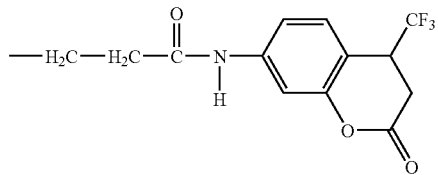

(i.e. fluorescence material). As set forth above, the addition of hydrophilic or lipophilic functional group onto the P2VP-b-PHIC-b-P2VP triblock copolymer shows a new possibility in studying morphology at the level of from micrometer to nanometer.

The block copolymer herein is an amphiphilic triblock copolymer comprising hydrophilic coil-shaped poly(2-vinylpyridine) block and lipophilic rod-shaped poly(alkylisocyanate) block. Due to the coil-like shape and an electric property, the poly(2-vinylpyridine) has been drawing much attention as a complex-forming material with metal, a conductive material and an optical device. The poly(n-hexylisocyanate) is known to be relatively rigid because of the amide bond in the main chain and have a helix structure like polypeptide. Therefore, the triblock copolymer herein, which comprises the aforementioned blocks in well-controlled ratios, is highly likely to be used as a new advanced material.

What is claimed is:

1. An amphiphilic triblock copolymer comprising a coil shaped hydrophilic poly(2-vinylpyridine) block and a rod-shaped lipophilic poly(alkylisocyanate) block, wherein the copolymer has a coil-rod-coil or a rod-coil-rod structure.

2. The amphiphilic triblock copolymer having a rod-coil-rod structure of Formula I:

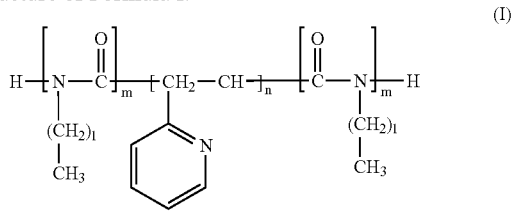

wherein l is an integer of 2-8; n is a degree of polymerization of the poly(2-vinylpyridine) block; m is a degree of polymerization of the poly(alkylisocyanate) block; and $f_{2vp}$ is a fraction of the poly(2-vinylpyridine) block in the range of from 0 to 0.7 ($0<f_{2vp}<0.7$).

3. The amphiphilic triblock copolymer having a coil-rod-coil structure of Formula II:

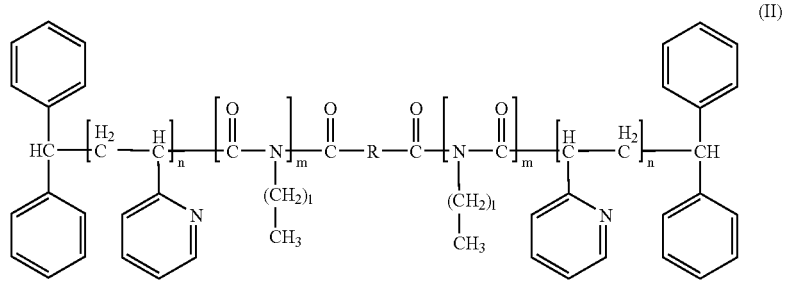

wherein R is a $C_1$-$C_6$ alkyl group unsubstituted or substituted with hydroxyl, $C_1$-$C_{10}$ alkyl, amide, ether, phenyl, hetero aromatic group or a functional group selected from

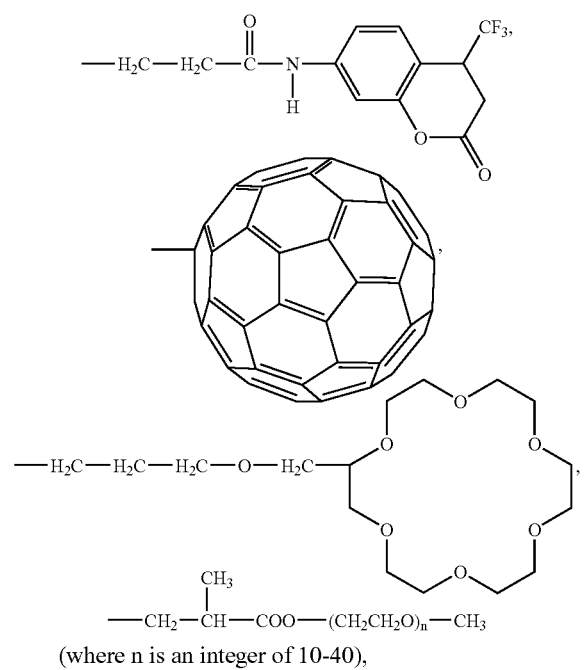

(where n is an integer of 10-40), l is an integer of 2-20; n is a degree of polymerization of the poly(2-vinylpyridine) block; m is a degree of polymerization of the poly(alkylisocyanate) block; and $f_{2vp}$ is a fraction of the poly(2-vinylpyridine) block and ranges from 0 to 0.7 ($<f_{2vp}<0.7$).

4. A process of preparing a triblock copolymer of Formula (I) in claim 2, comprising:

(a) preparing a poly(2-vinylpyridine) block having carbanion at each end by performing living polymerization using metal naphthalenide (M-Naph) as an initiator, (b) converting a counter-cation at the each end of the poly(2-vinylpyridine) block into a sodium ion by adding sodium tetraphenylborate ($NaBPh_4$), and (c) adding alkylisocyanate monomer and performing a polymerization:

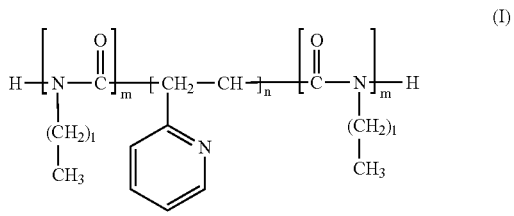

wherein l, n and m are same as defined in claim 2.

5. The process of claim 4, wherein the molecular weight distribution (Mw/Mn) of the poly(2-vinylpyridine) is in the range of from 1.00 to 1.62.

6. The process of claim 4, wherein a mixture of methanol and acetic acid is used to terminate the polymerization in step (c).

7. The process of claim 4, wherein the molecular weight distribution (Mw/Mn) of the triblock copolymer is in the range of from 1.00 to 1.43.

8. A process of preparing a triblock copolymer of Formula (II), comprising:

(a) preparing a poly(2-vinylpyridine) block by performing living polymerization using potassium diphenylmethane (K-$CHPh_2$) as an initiator, (b) converting potassium counter-cation into sodium by using sodium tetraphenylborate ($NaBPh_4$), (c) preparing poly(alkylisocyanate) block by adding alkylisocyanate and performing polymerization, and (d) coupling the poly(2-vinylpyridine) block and the poly(alkyisocyanate) block by using di(carbonylhalide) coupling agent:

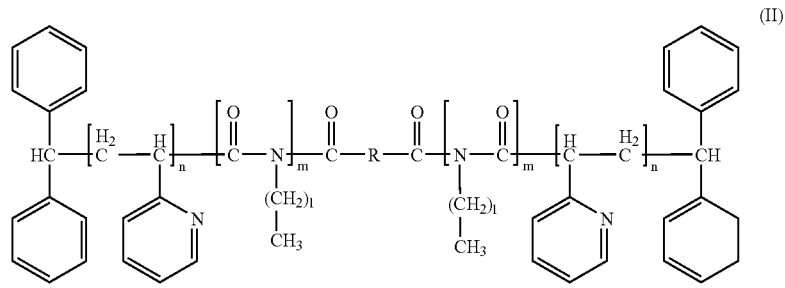

wherein R, l, n and m are same as defined in claim 3.

9. The process of claim 8, wherein the molecular weight distribution (Mw/Mn) of the poly(2-vinylpyridine) is in the range of from 1.00 to 1.09.

10. The process of claim 8, the coupling is performed in the presence of amine base.

11. The process of claim 8, wherein a mixture of methanol and acetic acid is used to terminate the excess P2V-PHIC, if any.

12. The process of claim 8, wherein the molecular weight distribution (Mw/Mn) of the triblock copolymer is in the range of from 1.00 to 1.18.

* * * * *